Figure 1:
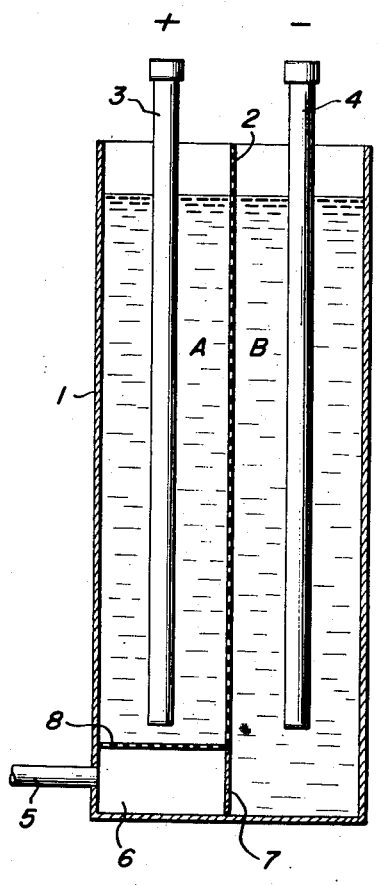

United States Patent Office 2,901,522
Patented Aug. 25, 1959

2,901,522

OXIDATION CELLS

Anton Bopp, Meilen, Switzerland

Application October 17, 1951, Serial No. 251,835

3 Claims. (Cl. 136—84)

The presence and the employment of step-by-step and catenary systems of any desired kind in decomposition or exchange processes which can be classified in the widest sense as processes of oxidation are not new. The active factor here is the condition of energy distribution, which can be represented in the known manner, in respect of given reaction partners, by the pattern of a concentration cell. Differentiations into detailed situations such as that of the liquid cells, behaviour corresponding to the diffusion cells at the phase boundaries, catalysis of the reaction speed of decomposition reactions, etc., are immaterial insofar as the basic principle is concerned.

The success hitherto obtained in the handling of concentration cells has generally been, in practice, slight. This is particularly true of oxidation cells, and even more so of cells of the last-mentioned kind whose internal exchange and energetic productivity takes place without external heat effect, in the form of cold oxidation.

The invention in accordance with the claims hereafter enumerated relates to oxidation cells of the cold type whose energetic productivity, with the maximum elimination of external heat effect in decomposition or exchange reactions, ensures practically 100% energy yields, all in the form of electrical energy, on the part of the oxidation reactions involved.

The cells with cold oxidation according to the invention are distinguished by high E.M.F., minimum internal resistance, high reaction speed, and therefore high current strength, constancy of voltage in operation, and extremely high capacities in relation to weight and volume. The economy of this form of oxidation is unparalleled. In cells as specified above, eddy-currents arise which exist entirely without metallic electrodes. As a simple text-book example (Foerster, Elektrochemie, 1923) the following cell may be cited:

Hg/0.1 KCl/0.01 KCl/0.01 HCl/0.1 HCl/0.1 KCl/Hg which, without being connected to an external circuit, passes over into the following cell:

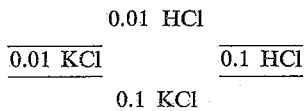

A cell with phase power has, for instance, the form of: Ag/AgCl sat. n-AgNO$_3$/AgCl sat. n-KCl/AgCl solid/ AgCl sat. n-AgNO$_3$/Ag, or metal/metal salt sat./acid/ membrane/alkali/m. salt sat./metal. The principle illustrated by such cells is that concentration cells can be cut up at any desired points by the introduction of independent probes or electrodes for the tapping of current to the exterior. The use of dependent electrodes is treated below. In this way cellular systems are produced consisting of a single or a plurality of cells which may even be independent of one another.

The above examples become oxidation cells in accordance with the invention if, the described oxidation reactions, decompositions or exchanges in the broadest sense of the term oxidation, occur in such a way that their energy balance is capable of being externally tapped by probes or electrodes, the probes participating or not, as the case may be, in the decomposition or exchange reaction. Reversible and irreversible reactions are permissible. The former can be regenerated to the starting condition by the supply of energy from the exterior, the latter are not open to such regeneration. Hydrogen concentration and oxygen concentration cells, among others, serve for the first type of cells. The probes may be of any materials which, in accordance with the examples given hereinafter, take care of the tapping of the current, or which are able to serve as leading reaction partners with sufficient stability in the case of interruption of the flow of current. Since hydrogen and oxygen concentration cells do not of themselves yield maximum results, cells according to the invention require the presence of substances of the groups 6a, 7a, 6b and 7b of the periodic system. An increase in potential may be produced by the choice of electrodes which choice may be made as freely as desired. Additions of agents which, by being present or by participating, intermittently or definitely change their hydrogen or oxygen content, are permissible and are in part useful in the known manner. The reactions which may in this case vary the H or O$_2$ pressure zone-wise or, in the electrodes in a manner determining potential, are, for the most part, individually of an extremely complicated nature.

Oxygen carriers which are anodically regenerated with an accompanying change or charge, sometimes at high speed, such as ceric salts and other catalyzers of identical action which often render valuable services in the electrolytic oxidation of organic compounds, are not essential here, but rather potential-raising agents of the type of $SO_4''$, $HSO_4'$, $ClO_4'$ and other anions of oxyacids, to which the role of regenerators, with respect to oxygen exchanges, may be attributed.

In addition to the regulation of potential, such agents assume at the same time, the function of regulating the speed of exchange, in this case the speed of oxidation, by accelerating it. Consideration of these factors automatically leads to the establishment of the rules for elements which are of practical utility for the delivery of current, elements which, in addition to the highest possible E.M.F. and minimum internal resistance, should incorporate maximum reaction speeds, in which connection the suppression of changes of concentration at the working electrodes, ensures constant voltages.

In order to keep the points of maximum and minimum concentrations in an oxidation cell at constant operating conditions, the reaction products must be removed as rapidly and completely as possible from the reaction zone. Ideal for this purpose are, in the first place, insoluble precipitates and, for gaseous waste products, rapidly effective resorption and degassing in the second place. Both methods of maintaining the operation constant are readily realizable by known means in the oxidation cell.

There still remains a word to be said in regard to the maximum and minimum concentrations in practical cells. In this connection the reference, at the outset, to a concentration cell with phase power constituted an indication in the direction of maximum conditions, which can be achieved in regard to oxygen pressure, for instance, by means of oxygen in solid or dissolved form, or by storage in contact with surfaces in quasi-solution, unstable combination, etc., up to extremely high pressures. A familiar example of this is the behaviour of hydrogen gas in platinum.

The minimum conditions in the cells are taken care of at the points of maximum exchanges, by withdrawal of the reaction products with the cooperation, if necessary, of catalytic and quasi-catalytic agents, as described above.

There now follow examples which put into effect the above introductory and explanatory remarks. The result is the realization of "cold oxidation," in a form which satisfies high technical and economic requirements, by means of oxidation cells.

*Examples of combustion cells*

(a) Irreversible systems:

(1) C in alkali (for example NaOH or soda, etc)/membrane or NaCl solution or $MgCl_2$ solution/Pt in NaOCl solution: or alternatively: C in alkali as above/membrane/Pt in NaOCl together with NaCl-solution or $MgCl_2$-solution. In this oxygen concentration cell, NaOCl is the point of a high oxygen pressure which has its minimum at the carbon electrode where $CO_2$ is formed. The cell, notwithstanding details of theoretical interest, does not as yet meet the requirements set out in the specification. It is uneconomical because it requires platinum and because hypochlorite is consumed as a source of oxygen.

Under pressure with soda, the above cell can be used for the oxidative disintegration of carbon, it being possible to use carbon in place of the costly platinum, and to replace NaOCl partly or completely by NaCl plus atmospheric oxygen. An increase in the yield of carbonic acid from the various acids likewise accuring in this process is achieved catalytically and quasi-catalytically by means of simple agents such as ceric salts and others, and possibly further increased by the simultaneous use of $SO_4''$ ions in the form, for example, of sodium sulfate, as well as, possibly, from F ions of an NaF solution or NaOF solution, etc.

The pattern of the cell thus gradually changes in the direction of the present invention.

The positive carbon electrode can be operated alternatively in $CrO_3$ instead of NaOCl, if desired, together with moderately concentrated or concentrated sulfuric acid and possibly fluorine ions, in the form of its alkali salts, for example, with and without air supply, the chromic acid being regenerated. Most simply, the chromic acid is presented in the above example, together with NaCl solution, containing if necessary, halogen ions, in the form of their alkali salts, for example, and with atmospheric oxygen. The application of pressure can, if desired, be completely omitted, and soda at the negative pole be at the same time wholly or partly replaced by lyes, such for example as NaOH, KOH, etc. The use of catalytic and quasi-catalytic accelerators at the negative pole is an additional optional measure.

A cell according to the invention thus has, for example, the form: C in NaCl solution plus $CrO_3$ solution with atmospheric oxygen supply/membrane/C in aqueous solution of KOH plus soda.

The concentrations of the separate solutions are variable within very wide limits, and such variation influences only the intensity of the exchanges and the freezing point or other secondary features. The admissibility of the simultaneous employment of activators has been exhaustively treated above. The chain or cell is an oxidation cell with cold combustion without heat effect in operation. Carbon oxidizes to carbon dioxide at the negative pole. With a supply of air, the system continuously regenerates itself. The operational features correspond to the requirements set out in the specification. The yield of electrical energy of the combustion reaction is practically 100%. What has been stated in the specification applies to the tapping probes or electrodes.

(2) As an example of metal combustion, the following cell may be specified, with reference to the foregoing: Zn amalg. against carbon in $H_2SO_4$ plus $CH_3COOH$ plus $CrO_3$ plus $HgCl_2$.

For example: 30 gm. $H_2O$ plus 36 gm. $H_2SO_4$, 94%, plus 12 gm. $CH_3COOH$, 80%, plus 12 gm. $CrO_3$ plus 0.2 gm. $HgCl_2$.

Here, Zn oxidizes almost directly at all current intensities, in conformity with:

$$3Zn \text{ plus } 2CrO_3 = 3ZnO \text{ plus } Cr_2O_3$$

The example is on the borderline of reversibility, in that the freshly precipitated chromium oxide or chromium hydroxide passes over into chromium sulfate in the presence of sufficient sulfuric acid and adequate concentration ratios, the chromium sulfate being regeneratable by reversal of the current. In suitable modification, therefore, the same oxidation cell can be under reversible systems.

(b) Reversible system: Pb against carbon in $H_2SO_4$ plus $HNO_3$ plus $CrO_3$.

By varying the operational factors, a wide range of variation is permitted for the concentrations of the solution. To illustrate the principle only, the following examples are given: 15 gm. $H_2SO_4$, 94%, plus 19 gm. $HNO_3$, 60%, plus 10 gm. $CrO_3$ plus 30 gm. $H_2O$, together with carbon and lead as electrodes, or, alternatively together with the latter, 18 gm. $H_2SO_4$ as above plus 27 gm. $HNO_3$ as above plus 35 gm. $CrO_3$ plus 20 gm. $H_2O$.

At an intermediate stage, yellow lead chromate synthesizes as a solid phase.

All the above-mentioned examples of concentration or oxidation cells are characterized by high E.M.F., low internal resistance, high reaction speed or current output, constancy of voltage, and relatively high capacitances. They represent in their respective ways the principle of the invention in accordance with the patent claims and the specification.

The accompanying drawing shows the construction of two types of cells that may be used according to my invention.

Figure 2:
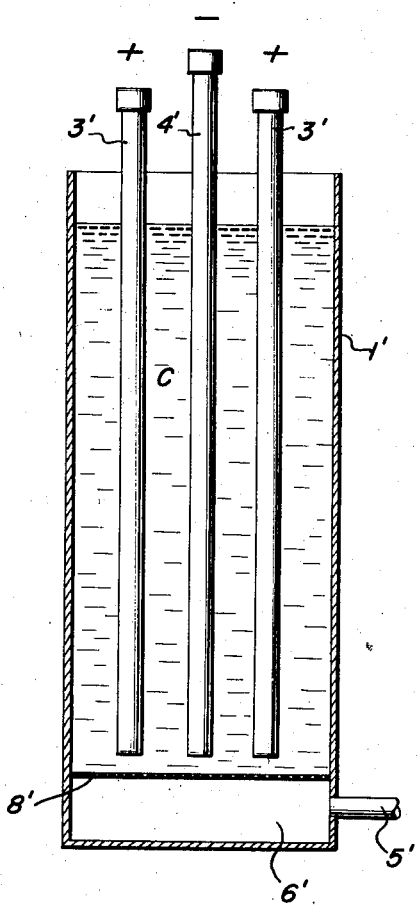

In the drawing:

Fig. 1 is a view in vertical section of a cell which can be used when utilizing two different electrolyte solutions and Fig. 2 is a view similar to Fig. 1 but showing a cell which can be used when utilizing a single electrolyte solution.

Referring to Fig. 1 there is shown a container 1 having a permeable diaphragm 2 extending from the top of the container and terminating short of the bottom thereof and dividing the container into two sections each of which sections is substantially filled with a different electrolyte solution A and B of a type already described. A cathode 3, such as carbon, extends into solution A and an anode 4 which may also be of carbon extends into solution B. The two electrodes are supported in the container by means not shown. Adjacent its lower end, the container is provided with an inlet 5 for gas which may be air or oxygen. The gas flowing through inlet 5 enters a chamber 6 formed by a partition 7 which extends from the lower end of the diaphragm 2 to the bottom of the container and a permeable diaphragm 8 extending from the top of partition 7 to the side wall of the container.

The modification shown in Fig. 2 comprises a container 1', cathodes 3' which may be of carbon, anode 4' which may be of zinc amalgam, lead or other conducting material except carbon, gas inlet 5' and gas chamber 6' formed by permeable diaphragm 8'. The space between the diaphragm 8' and the top of the container is substantially filled with an electrolyte solution C. It may be seen, therefore, that the construction shown in Fig. 2 is similar to that shown in Fig. 1, except that diaphragm 2 is not used in the modification shown in Fig. 2 and the diaphragm 8' of Fig. 2 extends across the entire container from wall to wall thereof to form gas chamber 6'. Fig. 2 also shows two cathodes and one anode. The solution C differs in composition from solutions A and B.

The operation of the two cells shown in the drawing is obvious from the description of the invention already given.

My invention includes all modifications that fall within the scope of the appended claims.

What I claim is:

1. As a source of electricity, an oxidation cell comprising an anode of carbon, a carbon cathode, aqueous electrolyte solutions surrounding and in contact with said cathode and said anode, the aqueous solution surrounding said anode containing $CrO_3$ and sulfuric acid in effective amounts as essential ingredients dissolved therein and the aqueous solution surrounding said cathode comprises an alkali and means for introducing air into said electrolyte solution at a region of the cell adjacent said cathode.

2. As a source of electricity, an oxidation cell comprising an anode of zinc amalgam, a carbon cathode, an electrolyte consisting essentially of an aqueous solution of sulfuric acid, acetic acid, $CrO_3$ and $HgCl_2$ surrounding and in contact with said anode and means for introducing air into said electrolyte at a region of the cell adjacent said cathode.

3. As a source of electricity, an oxidation cell comprising an anode of lead, a cathode of carbon, an electrolyte consisting essentially of an aqueous solution of sulfuric acid, nitric acid and $CrO_3$ and means for introducing air into said electrolyte at a region in the cell adjacent said cathode.

References Cited in the file of this patent
UNITED STATES PATENTS

| | | |
|---|---|---|
| 328,607 | Partz | Oct. 20, 1885 |
| 368,190 | Case | Aug. 16, 1887 |
| 511,159 | Poppowitsch | Dec. 19, 1893 |
| 555,511 | Jacques | Mar. 3, 1896 |
| 569,591 | Short | Oct. 13, 1896 |
| 764,595 | Jone | July 12, 1904 |
| 884,664 | Jungner | Apr. 14, 1908 |
| 940,734 | Sandy | Nov. 23, 1909 |
| 2,257,129 | Ruben | Sept. 30, 1941 |
| 2,399,127 | Lipinski | Apr. 23, 1946 |

FOREIGN PATENTS

| | | |
|---|---|---|
| 13,807 | Great Britain | of 1890 |

OTHER REFERENCES

Serial No. 385,561, Szabo (A.P.C.), published May 11, 1943.